April 24, 1956 R. W. MOORE ET AL 2,743,401
MAGNETIC AMPLIFIER CONTROL SYSTEM
Filed Sept. 30, 1952 4 Sheets-Sheet 1

WITNESSES:
Robert Baird
Urban H. Faubion

INVENTORS
Raymond W. Moore, William D. King,
James T. Carleton & Loren F. Stringer.
BY
Paul E. Friedemann
ATTORNEY April 24, 1956  R. W. MOORE ET AL  2,743,401
MAGNETIC AMPLIFIER CONTROL SYSTEM
Filed Sept. 30, 1952  4 Sheets-Sheet 2

INVENTORS
Raymond W. Moore, William D. King,
James T. Carleton & Loren F. Stringer.
BY
Paul E. Friedemann
ATTORNEY INVENTORS
Raymond W. Moore, William D. King,
James T. Carleton & Loren F. Stringer.

United States Patent Office 2,743,401
Patented Apr. 24, 1956

2,743,401

MAGNETIC AMPLIFIER CONTROL SYSTEM

Raymond W. Moore and William D. King, Buffalo, N. Y., and James T. Carleton and Loren F. Stringer, Pittsburgh, Pa., assignors to Westinghouse Electric Corporation, East Pittsburgh, Pa., a corporation of Pennsylvania Application September 30, 1952, Serial No. 312,212

29 Claims. (Cl. 318—7)

This invention relates to motor control systems and more particularly to Ward Leonard systems and a feedback control system.

The speed of an electric motor which has a constant field excitation and a given load may be varied by changing the voltage applied to the motor armature. If the controlled variable of the feedback control system is the voltage at the brushes of the generator of the Ward Leonard system then the motor speed will be proportional to a reference input voltage when the motor is at no-load. With other conditions of loading the motor speed will be approximately proportional to the reference input voltage. If an IR compensation signal proportional to motor load is introduced into the control elements of the feedback control the motor speed will more closely approximate proportionality of the reference input. In fact if the motor speed-load curve is linear, then an IR drop compensation signal in combination with a generator armature voltage feedback will be the same as if a pilot generator or tachometer voltage proportional to motor speed had been used as the controlled variable. It is evident that the combination armature voltage feedback and IR compensation signal for this condition is a net signal equal to motor C. E. M. F. which is a direct measure of motor speed.

The system illustrated herein has therefore the flexibility of adjustment permitting approximate regulation of motor speed when the generator armature voltage only is used or is a precise speed control system when IR compensation is used.

It is the general object of this invention to provide a control system for electric motors having a high speed of response, a maximum of useful output and which is simple, reliable, and positive in action.

A further object of this invention is to provide a control system for electric motors which regulates the speed by controlling the voltage which is supplied to the motor.

Another object of this invention is the provision of a motor control system whereby the motor speed is controlled as a function of a selected reference voltage and the voltage of the motor supply generator, namely the generator supplying electric energy to the motor armature.

A broad object of this invention is the provision of motor control systems whereby the motor speed is controlled as a function of a selected reference voltage and the voltage of a generator.

Still another object of this invention is the provision of a motor control system whereby the motor speed is controlled as a function of a selected reference voltage, the voltage of the motor supply generator, and a selected portion of the IR drop in the motor-generator loop.

A more specific object of this invention is to provide a motor control system which compares the motor supply generator voltage, compensated for a selected portion of the IR drop, with the voltage of a reference source, or a function of the voltage of a reference source, and uses the error quantity to cause the voltage of the motor supply generator to affect the motor speed.

Another object of this invention is to provide a control system for the motor of a variable voltage drive wherein the basic excitation for the motor supply generator of the drive is controlled by a source of adjustable reference voltage, and effecting regulation of the motor by utilizing a differential between the reference voltage, or a function of the reference voltage, and the generator voltage compensated for a selected portion of the IR drop.

A still further object of this invention is to provide a control system for a plurality of motors for regulating the speeds of the motors with relation to each other by matching the voltages of the supply generators, compensated for a selected portion of the IR drop, with a common reference voltage source, or a function of a common reference voltage source, and utilizing the differential in each case to cause the generator voltage of each drive to maintain a preselected relationship between the speeds of the respective motors.

An ancillary object of this invention is to provide a control device which has a maximum of useful output, is polarity sensitive and has a minimum time delay.

Another ancillary object of this invention is to provide a control device which has a linear amplifier characteristic over its operating range.

For a better understanding of the invention, reference should be had to the accompanying drawings, in which:

Figures 1A and 1B combined show a diagrammatic view of the control circuits of two stands for a tandem cold mill embodying the invention;

Figure 1A:
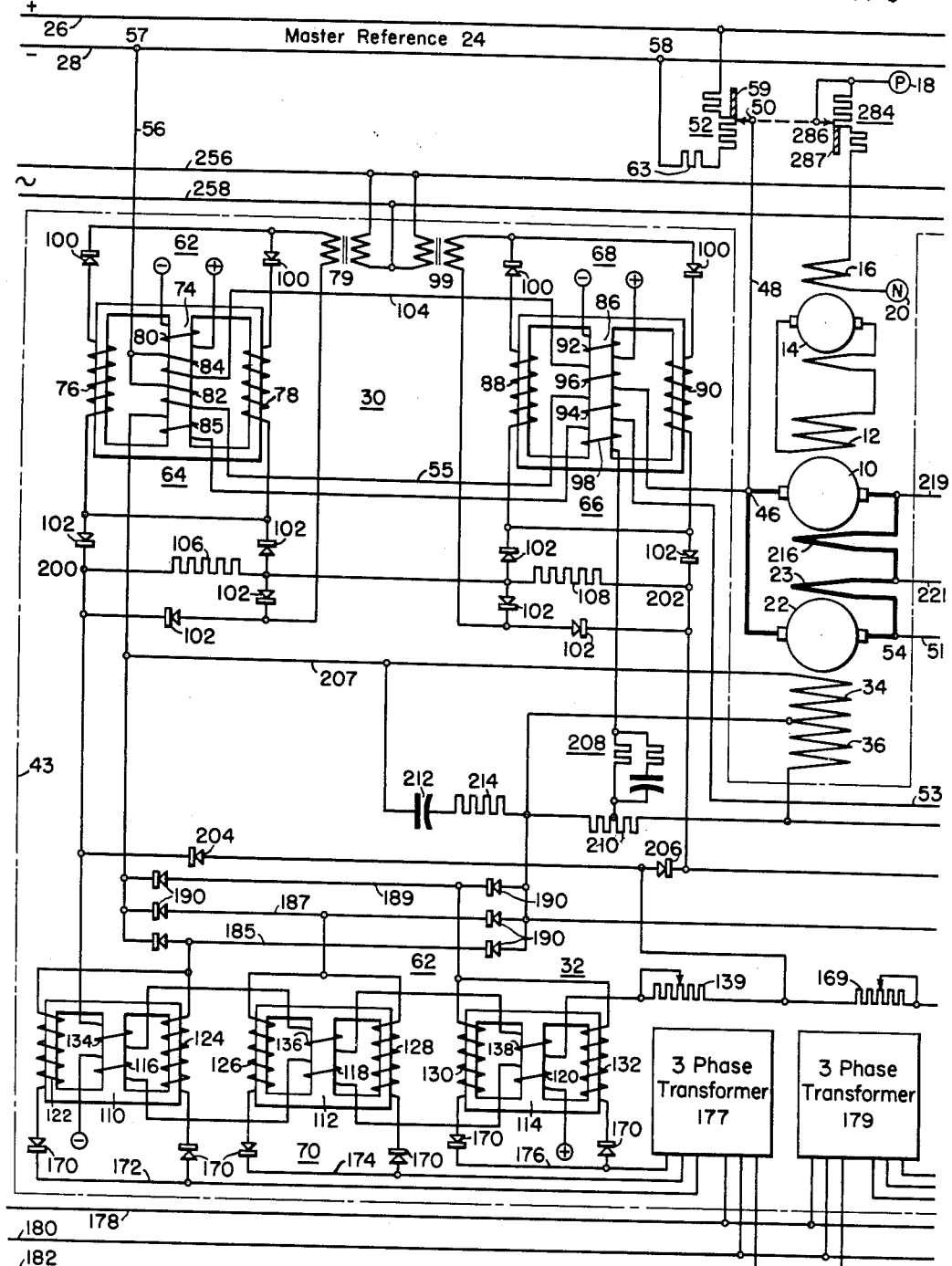
Figure 1B:
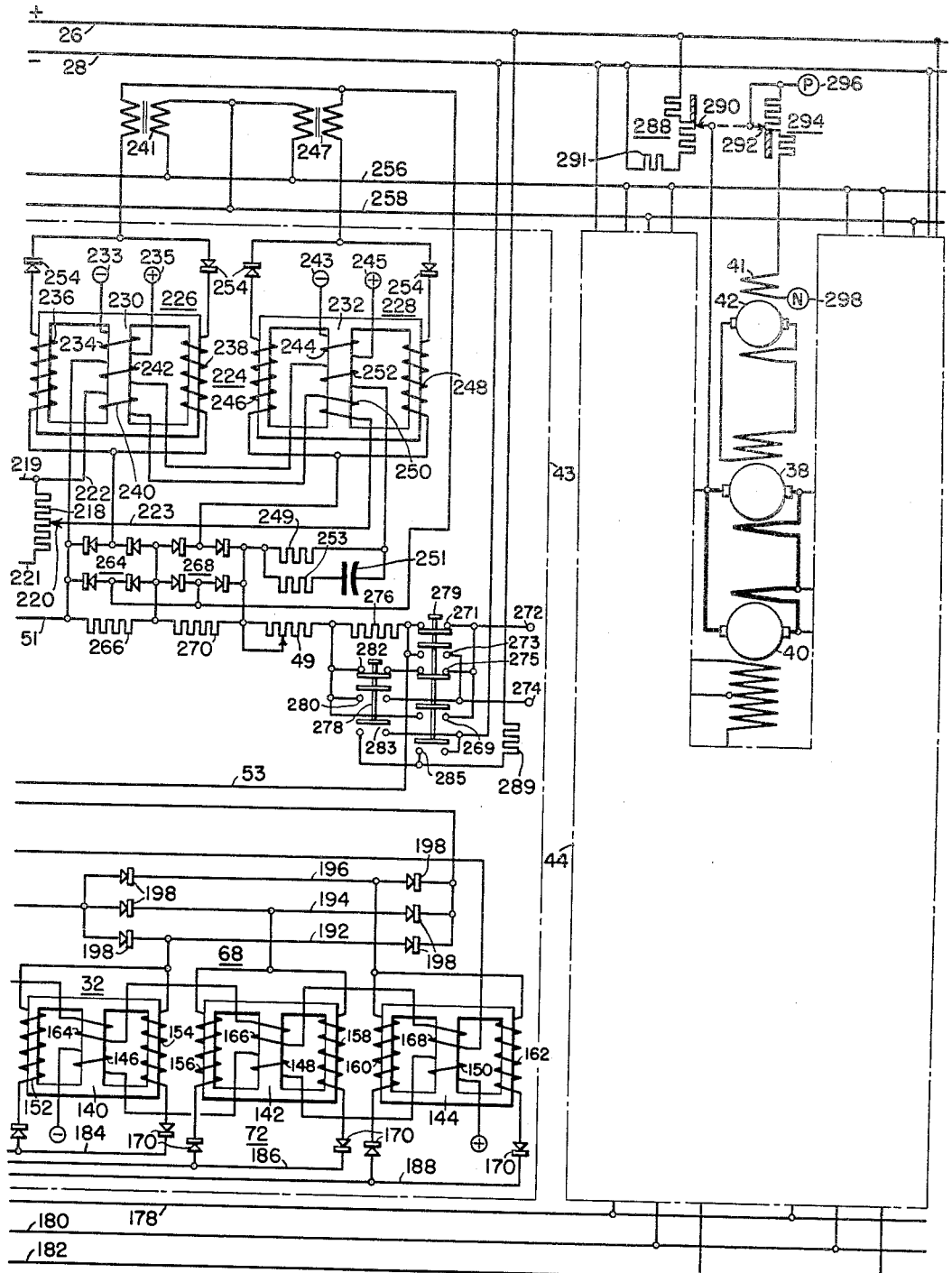
Figure 5:
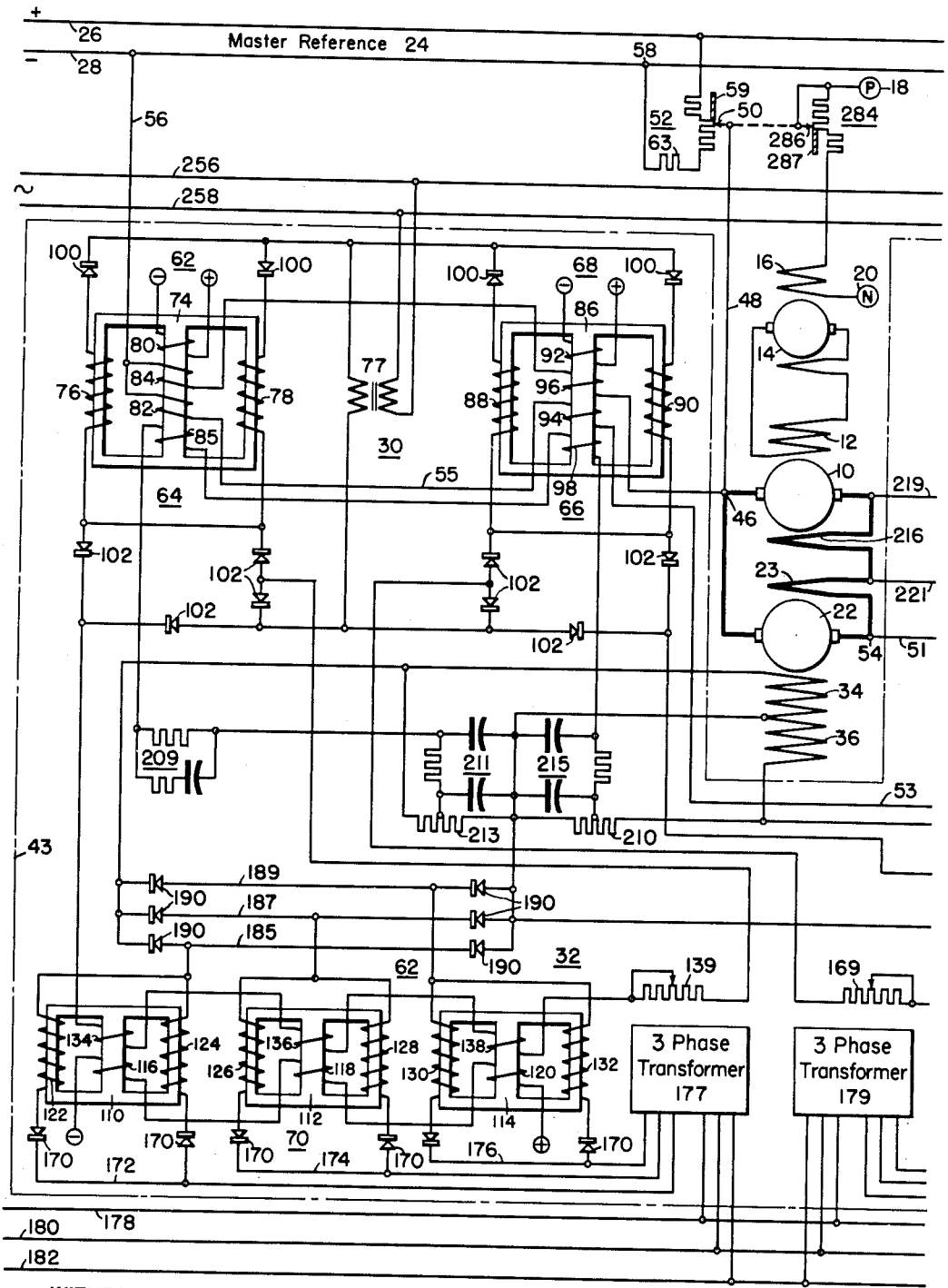

Figs. 5 and 1B combined shows a diagrammatic view of modified control circuits of two stands for a tandem mill embodying the invention.

The invention applies broadly to motor control systems but is illustrated and described here in a tandem cold reduction mill as it has been used most effectively in such a system.

With specific reference to the form of the invention illustrated in the drawings, the numeral 10 indicates the drive motor for one stand of a tandem reduction mill. The motor 10 has a field winding 12 which is excited by an exciter 14 driven at constant speed and which in turn has its field winding 16 disposed to be connected through suitable rheostatic control means to be excitted from a constant potential source connected to terminals 18 and 20. The motor 10 is part of a Ward-Leonard drive which contains the main motor-supply generator 22. The control is obtained by comparing the voltage across generator 22 with a portion of the voltage from an adjustable master reference source 24 supplied by bus bars 26 and 28. The difference between the voltage of generator 22 and the voltage of the adjustable master reference source 24, with which it is compared, is used as a control quantity for amplification means. The amplification means includes a first stage of magnetic amplifiers 30 and a second stage of magnetic amplifiers 32. The first stage controls the second stage and the second stage determines the excitation of the forward field winding 34 and the reverse field winding 36 of generator 22 to thus control the speed of the motor 10. The controls for the first mill-stand are shown enclosed in box 43 of Figs. 1A and 1B.

While the cores of all of the magnetic amplifiers are shown as three legged cores, the cores may take any of the forms well known in the art.

Motor 38, generator 40, and exciter 42 represent the drive components of a second mill stand of the tandem cold reduction mill and the controls for the drive components are illustrated as the box 44 which contains control elements of the same kind and in the same circuit relationship as the control elements recited for the first stand. The master reference 24 is common to both stands and the drive motors 10 and 38 have a common mechanical load, not indicated on the drawings, but which would be the steel strip in the case of a tandem cold reduction mill.

Since the motor 10 has a constant preselected excitation on its field 12, its speed is determined by the voltage on its armature for a given load, that is, it is determined by the voltage of generator 22. Generator 22 is driven at constant speed and therefore the sense and magnitude of its voltage output is determined by the excitation of its field windings. Generator 22, as already stated, has a forward field winding 34 and a reverse field winding 36 which are energized in accordance with the output of the second stage magnetic amplifiers 32. In normal operation, the forward field winding 34 of the main generator 22 is excited such that the voltage of generator 22 will cause the motor 10 to rotate at a preselected speed. Under these conditions, the voltage of generator 22 is matched against the voltage of the adjustable master reference source 24 which appears between terminal 58 and tap 50 on potentiometer 52. That is, the summation of the voltages between terminal 54 (between the generator 22 and its commutating field 23) and terminal 58 on lead 28 of the adjustable master reference source 24, which comprises only the voltage of generator 22 and the voltage between tap 50 on potentiometer 52 and terminal 58, is approximately zero and therefore, very little or no current will flow in the control circuit loop which consists of generator 22, terminal 46, tap 50 on potentiometer 52, resistor 63 and terminal 58 on bus 28 of adjustable master reference source 24, terminal 57 on the same bus, lead 56, control winding 82 on magnetic amplifier 64, lead 55, control winding 94 on magnetic amplifier 66, lead 53, through contacts 271 and 275 on switch 279, contacts 282 on switch 278, voltage gain adjusting resistor 49, mixing resistors 270 and 266, lead 51, and terminal 54 at the generator 22.

If a sudden load should be applied to the element driven by the motor 10 or if the operator should change the voltage of the adjustable master reference source 24 in order to change the speed of motor 10, then the voltage of the generator 22 will be different from that appearing between tap 50 on potentiometer 52 and terminals 58 on bus 28. Disturbances cause a very much greater difference in voltage between generator 22 and that appearing between tap 50 on potentiometer 52 and terminals 58 on bus 28 than the voltages which would normally appear so that an error voltage is thus produced, the sense of which is determined by which source supplies the greater voltage, and the magnitude of which is determined by the difference value between these voltages. Since the voltage difference appears between terminals 58 on the bus 28 and terminal 54 on generator 22, the circuit included between these points will be termed as the error source. When an error voltage appears across the error source, a substantial current will circulate around the control circuit loop. This circulating current is used to return the motor 10 to the preselected speed if the error was caused by a deviation from that speed or it is used to fix the speed of motor 10 at some new value if the error was caused by a change in voltage of the adjustable master reference source 24.

The control by this invention is accomplished by using two stages of amplification namely the magnetic amplifiers 30 and 32. Both magnetic amplifier stages 30 and 32 consist of two sections, or channels, a forward section, or channel 62 made up of a single-phase magnetic amplifier 64 in the first stage and the three-phase magnetic amplifier 70 in the second stage. The reverse section, or channel 68 consists of a single-phase magnetic amplifier 66 in the first stage and a three-phase magnetic amplifier 72 in the second stage.

Magnetic amplifier 64 in the first stage consists of a core member 74, main windings 76 and 78, a biasing winding 80 (a control winding 82, a basic excitation winding 84, and an antihunt winding 85. The single-phase magnetic amplifier 66 in the first stage of the reverse section, or channel 68 consists of a core member 86, main windings 88 and 90, biasing winding 92, control winding 94, basic excitation winding 96 and an antihunt winding 98. The amplifiers are self-saturating and have rectifiers 100 in series with the main windings and load rectifiers 102 in full bridge arrangement with the respective loads, in this case with mixing resistors 106 and 108 and control windings 134, 136 and 138 of magnetic amplifier 70, or control windings 164, 166 and 168 of magnetic amplifier 72. The main windings of magnetic amplifiers 64 and 66 are supplied through the individual isolation transformers 79 and 99 respectively from the alternating current bus bars 256 and 258.

The biasing windings 80 and 92 set the operating point of their respective magnetic amplifiers and are energized in same senses. The magnetic amplifiers 64 and 66 in the first stage of amplification 30 are adjusted to operate at the midpoint of their characteristics in the preferred embodiment of the invention by a source of biasing voltage on the respective biasing windings 80 and 92 when there is no excitation on the basic excitation windings 84 and 96 nor excitation of the control windings 82 and 94. Under these conditions the two identical magnetic amplifiers 64 and 66 will have outputs of equal magnitude but opposite senses. That is, magnetic amplifier 64 will have an output voltage across its load resistor 106 which is equal in magnitude and opposite in sense to the output voltage of magnetic amplifier 66 which appears across its load resistor 108. Thus, the total output voltage from the first stage of amplification 30 as it appears across both resistors, between terminals 200 and 202, is zero.

The control windings 82 and 94 are wound in the opposite sense on their respective cores and are connected in series with leads 56, 55 and 53 so that any circulating current due to an error voltage will flow through the windings. The direction of the current flow in the control windings 82 and 94 is determinative of which winding will have an excitation that will drive the core of its amplifier toward saturation. It will be seen that any circulating current in the circuit of control windings 82 and 94 will tend to cause the output of one of the magnetic amplifiers 64 and 66 in the first stage of amplification 30 to have an increased output and the other to have a decreased output. If the amplifiers 64 and 66 have unequal outputs, a voltage will appear between terminals 200 and 202 which is the difference between the voltages across the individual load resistors 106 and 108, respectively. The sense of the voltage between terminals 200 and 202 will depend upon which magnetic amplifier has the greater output, magnetic amplifier 64 in the forward channel 62 or magnetic amplifier 66 in the reverse channel 68.

The basic excitation windings 84 and 96 of the amplifier 64 and 66 are connected in series and are wound in the opposite sense on their respective cores 74 and 86. These windings are connected in series with leads 56, 104 and 48, and a portion of potentiometer 52, resistor 63 to terminal 58. The full voltage appearing between terminal 58 and tap 50 on potentiometer 52, is applied across the windings 84 and 96 in series to produce a basic excitation. Windings 84 and 96 are wound on their cores 74 and 86 in the same manner as the control windings 82 and 94 respectively. Their respective effects on the output of the amplifiers 64 and 66 are the same as that described for the control windings except that the basic excitations set the basic speed of the stand motor 10 whenever there is a voltage on the variable master reference source 24 and not just when there is an error voltage between terminals 58 and 54.

The excitation of winding 84 is such that it tends to drive the magnetic amplifier 64 in the forward channel 62 towards saturation under normal operating conditions for forward rotation of the motor 10 and determine the speed of the motor 10, while the current flowing through winding 96 on the magnetic amplifier 66 in the reverse channel 68 drives magnetic amplifier 66 toward cut off. Under these conditions, the output of the magnetic amplifier 64 in the forward channel 62 is greater than that of the amplifier 66 in the reverse channel 68. Thus, the voltage across load resistor 106 will be greater than that across the load resistor 108 and a voltage will result between terminals 200 and 202 which will result in a rotation of the motor 10 in a forward direction. The function of antihunt windings 85 and 98 and their circuit connections will be explained later.

The second stage amplifying means 32 also consists of two channels, the forward channel being labeled 62 and the reverse channel being labeled 68. As has already been indicated, each channel has a three-phase magnetic amplifier. The three-phase magnetic amplifier in the forward channel 62 is designated as 70 and the three-phase magnetic amplifier in the reverse channel is labeled 72.

The magnetic amplifier in the forward channel has cores 110, 112, and 114 which have biasing windings 116, 118 and 120, respectively, main windings 122 and 124, 126 and 128, and 130 and 132, respectively and control windings 134, 136 and 138, respectively. The three-phase magnetic amplifier 72 has cores 140, 142 and 144, biasing windings 146, 148 and 150 on their respective cores, main windings 152 and 154, 156 and 158, and 160 and 162, respectively, and control windings 164, 166 and 168, respectively.

The biasing windings 116, 118 and 120 on magnetic amplifier 70 are wound in the same sense as biasing windings 146, 148 and 150 on magnetic amplifier 72 in the reverse channel 68. The biasing windings fix the point of operation of the respective magnetic amplifiers and are in the preferred embodiment of the invention energized such that with zero control current the output of either amplifier is that minimum value which will permit obtaining from both forward and reverse generator fields 34 and 36 respectively, a net excitation which is a linear function of the amplifier control field current (i. e. in effect the forward and reverse fields 34 and 36 are selectively operated).

The main windings of each of the magnetic amplifiers are connected in series with saturating rectifiers 170 which pole their respective circuits. The main windings of the forward magnetic amplifier 70 are supplied from leads 172, 174 and 176 connected to the three-phase alternating current source on bus bars 178, 180 and 182 through isolating transformer 177. The main windings of the three-phase magnetic amplifier 72 are supplied from leads 184, 186 and 188, which are connected to the three-phase bus bars 178, 180 and 182 through isolating transformer 179.

The main windings 122 and 124, 126 and 128, and 130 and 132 of three-phase magnetic amplifier 70 are connected at their output sides to leads 185, 187 and 189, respectively. These leads form the output of magnetic amplifier 70 and are connected in circuit relationship with rectifiers 190 which are in three-phase full bridge arrangement. The output of the full-wave rectifier containing independent rectifiers 190, is connected across the forward field winding 34 of generator 22.

The main windings 152 and 154, and 156 and 158 and 160 and 162 of the three-phase magnetic amplifier 72 of the reverse channel 68 are connected to leads 192, 194 and 196 which are in circuit relation with rectifiers 198 connected in three-phase full-wave arrangement. The output of this full-wave arrangement is connected across reverse field winding 36 of generator 22.

The control windings 134, 136 and 138 on the magnetic amplifier 70 in the forward channel 62 are connected in series with each other and in series with the control windings 164, 166 and 168 of the magnetic amplifier 72 in the reverse channel. The control windings are all connected across terminals 200 and 202. The voltage between the terminals 200 and 202 represents the total voltage across the load resistors 106 and 108 of the first stage magnetic amplifiers 64 and 66. A gain adjusting resistor 139 is placed in series with the control windings 134, 136 and 138, and gain adjusting resistor 169 is placed in series with control windings 164, 166 and 168. The gain adjusting resistors 139 and 169 are used to adjust the gain of the magnetic amplifiers 70 and 72 such that a control current of a given magnitude and of a direction to give magnetic amplifier 70 an output will give an output current of the same magnitude as the output current for magnetic amplifier 72 if a control current of that same magnitude would flow in a direction to give magnetic amplifier 72 an output. Also, when a number of mill stands are in tandem and are controlled by the type system under discussion, the gain of each successive stand may be made slightly greater. This is accomplished by adjustment of the gain adjusting resistors of each stand. If the gain of each stand is very high, small variations in gain are not so important.

Rectifier 204 is placed in shunt with the control windings on the magnetic amplifier 70 and rectifier 206 is placed in shunt with the control windings on magnetic amplifier 72. These unidirectional conducting devices (204 and 206) are applied as described so that the control windings of each magnetic amplifier would conduct current in one direction only and are applied so that the control windings on magnetic amplifier 70 would have current flowing therethrough only when the control windings on magnetic amplifier 72 are shunted by rectifier 206 and the control windings on magnetic amplifier 72 would have current flowing therethrough only when the control windings on magnetic amplifier 70 are shunted by rectifier 204. Since the magnetic amplifiers are operated at approximately cut off, this insures that the magnetic amplifiers are selectively operated and that there is no circulation of control current in the magnetic amplifiers beyond that required for cut-off (i. e. the magnetic amplifiers are prevented from operating beyond cut-off).

It will be seen from the foregoing description that both forward and reverse fields 34 and 36 respectively will have the minimum value of current flowing in them from their respective magnetic amplifier channels 62 and 68 which will permit obtaining from both fields a net excitation which is a linear function of the amplifier control field current. Thus, the net excitation of the generator 22 is zero when there is zero control current. When one of the field windings 34 or 36 is energized, the other field winding receives only the algebraic sum of that minimum current referred to and that caused incidentally by flux linkages.

Another and a most important effect of the use of the unidirectional conducting devices 204 and 206 is to maintain a minimum time delay particularly in the neighborhood of cut-off. The magnetic amplifiers in the particular application illustrated here are operated approximately at cut-off and therefore the use of the unidirectional conducting means 204 and 206 are instrumental in achieving the excellent results obtained.

The previously mentioned antihunt fields 85 and 98 on the magnetic amplifiers 64 and 66, respectively, of the first stage of amplification are connected in series and in the same sense. The windings are supplied with derivative and direct differential feedback voltages from across the forward and reverse fields 34 and 36 respectively, by means of the resistance, capacitance network 208 through a balancing potentiometer 210 connected across the reverse field. The network 208 in the feedback-circuit serves as a damping circuit and serves to linearize the output of the magnetic amplifiers 64, 66, 70 and 72 in the forward and reverse channels 62 and 68. The capacitor 212 and resistor 214 were introduced in shunt across the forward field 34 of the generator 22 in order to further improve the wave form of the output voltage and to improve the commutation of the second stage forward amplifier 70. This commutation problem is critical only when magnetic amplifiers supply highly inductive loads as is here the case.

It has been described how the magnetic amplifiers in the forward channel 62 are operated, in response to a change in reference voltage of a change in generator voltage resulting from a change in motor speed, to energize the forward field 34 of generator 22 to increase or decrease the voltage of generator 22 until it matches the voltage between terminal 58 and tap 50 on potentiometer 52 and thus bring the motor back to a preselected speed. It has also been described how the amplifier channels 62 and 68 are selectively operated in accordance with the direction of current flow in the control windings 82 and 94 of the magnetic amplifiers 64 and 66, respectively, in the forward and reverse channels 62 and 68 of the first stage of amplification 30. Thus, it will be understood that the reverse winding 36 of generator 22 will be energized to cause a rotation of the motor 10 in a reverse direction or a retardation of the motor when the current in the control windings 82 and 96 is of a sense to cause the amplifiers in the reversed channel 68 to operate. It has already been noted that the direction of current flow in the control windings 82 and 94 of magnetic amplifiers 64 and 66, is determined by the error voltage between terminal 58 and terminal 54 which is determined by the difference of the voltage of generator 22 from a preselected value which is in some manner indicative of a motor condition, namely speed, from a preselected value.

In order to obtain proper motor control it is desirable to compensate for the variations in the IR drop in the motor-generator loop due to variations in current in the loop. The IR drop compensation voltage is obtained by placing the voltage drop across the motor commutating and compensating fields 216 across the potentiometer 218. The amount of IR drop compensation obtained can be adjusted by changing the position of tap 220 on potentiometer 218 and the adjustment of the amount of IR compensation is independent of other circuit adjustments.

When a voltage drop occurs across the field 216 and thus the potentiometer 218, current will be caused to circulate through leads 222 and 223, the direction of which is determined by the sense of the voltage across the field 216. A stage of amplification 224 consisting of two magnetic amplifiers 226 and 228 is provided to give the requisite IR drop compensation. The IR drop compensation magnetic amplifiers 226 and 228 are in push-pull arrangement and have cores 230, 232, respectively. Each magnetic amplifier is self-saturating. Magnetic amplifier 226 has biasing windings 234 with terminals 233 and 235 for a biasing source, main windings 236 and 238, control windings 240 and feedback windings 242. Magnetic amplifier 228, disposed in push-pull arrangement with magnetic amplifier 226, has biasing winding 244 with terminals 243 and 245 for a biasing source, main windings 246 and 248, control windings 250 and feedback winding 252. The biasing windings 234 and 244 of both magnetic amplifiers 226 and 228, fix the point of operation of the respective magnetic amplifiers and are wound in same senses. The control windings 240 and 250 of the magnetic amplifiers are connected in series with each other and are wound in the opposite sense. The control windings are connected in series with the leads 222 and 223, and therefore, carry any current circulating in those leads due to the IR compensation source. The main windings 236 and 238, and 246 and 248, of the magnetic amplifiers, are connected in series with saturating rectifiers 254 and are poled accordingly. The main windings 236 and 238 of magnetic amplifier 226 are supplied from a single-phase source through an isolation transformer 241 by bus bars 256 and 258. The same bus bars supply the main winding 246 and 248 of magnetic amplifier 228 through isolation transformer 247. The output of magnetic amplifier 226 is connected to load rectifiers connected in full bridge arrangement and designated 264 which supplies mixing resistor 266 in leads 51 and 53. The main windings 246 and 248 of magnetic amplifier 228 are connected to another set of rectifiers connected in full bridge arrangement and designated 268 which supplies mixing resistor 270 also in the series circuit with leads 51 and 53. Feedback windings 242 and 252 of the magnetic amplifiers 226 and 228 are connected in series and are supplied with a voltage derived from the output of the magnetic amplifiers.

To obtain proper operation of the control system, the output of the IR compensation magnetic amplifiers (the net voltage across resistors 266 and 270) must lag the voltage from the potentiometer 218 by a certain time delay. In order to obtain sufficient time delay a derivative feedback circuit is employed.

The derivative feedback circuit consists of feedback windings 242 and 252 in series with each other and an RC network which consists of resistor 253 and capacitor 251 in series. The time delay can be adjusted by adjusting the value of the elements of the network. A direct differential feedback path is obtained by using a resistor 249 in series with the same feedback windings 242 and 252. The direct differential feedback reduces the residual output when the IR signal is zero and serves to linearize the output of the amplifiers within their operating range.

Figure 4:
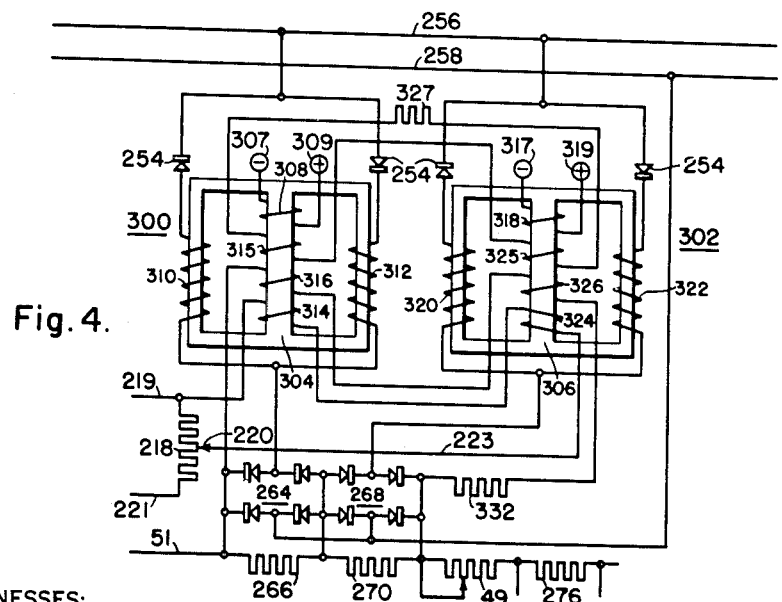
Fig. 4 shows diagrammatically an alternative IR compensation magnetic amplifier stage which has alternative linearizing means.

Another method of stabilizing and linearizing the output of magnetic amplifiers has been found to be very effective. The alternative method is shown in Fig. 4. The circuit of Fig. 4 can be substituted for the IR compensating magnetic amplifiers 226 and 228 in the circuit of Figs. 1A and 1B. The components of Fig. 4 other than the windings of the magnetic amplifiers themselves are given the same reference characters as the corresponding elements in the circuit of Figs. 1A and 1B.

Fig. 4 shows magnetic amplifiers 300 and 302 with core devices 304 and 306 respectively. Magnetic amplifier 300 has a bias winding 308 with terminals 307 and 309 for a biasing source, main windings 310 and 312, a control winding 314, a time delay winding 315, and a feedback winding 316. Magnetic amplifier 302 has a bias winding 318 with terminals 317 and 319 for a biasing source, main windings 320 and 322, a control winding 324, a time delay winding 325 and a feedback winding 326.

The windings on the magnetic amplifiers 300 and 302 of Fig. 4 are wound in the same senses and poled in the same manner as the corresponding windings of the magnetic amplifiers 226 and 228 of Fig. 1B. The difference in the circuits resides in the circuit of the feedback windings and in the addition of the time delay windings 315 and 325. In the circuit of Fig. 1B the feedback windings 242 and 252 are in series with each other and an RC network comprising capacitor 251 and resistor 253 in the derivative feedback circuit and they are in series with resistor 249 in a direct differential feedback circuit. The circuit of Fig. 4 shows the feedback windings 316 and 326 of the magnetic amplifiers 300 and 302 in a direct differential feedback loop which contains the two windings and a resistor 332. The feedback circuit which contains the resistor 332 again accomplishes the linearizing function that is accomplished by the direct differential feedback circuit which has resistor 249 in series in the circuit of Figs. 1A and 1B.

The two time delay windings 315 and 325 are connected in series with resistor 327 in a closed loop. This circuit gives the desired time delay as is accomplished by the RC network described for the circuit of Figs. 1A and 1B. The amount of time delay can be adjusted by changing the ohmic value of resistor 327. The resistor 327 is particularly effective in this case because the magnetic amplifiers are operated at cut off but it will be appreciated that if the amplifiers are to be operated at other points, each magnetic amplifier time delay winding would be connected in a series loop with its own time delay resistor. From the foregoing discussion it should be clear that the desired time delay for the magnetic amplifiers could be effected by connecting the time delay winding 315 of magnetic amplifier 300 in a series loop with a properly chosen resistor and connecting the time delay winding 325 of magnetic amplifier 302 in another loop circuit with another resistor of proper value. Thus, it should also be apparent that the same time delay may be accomplished with a single magnetic amplifier which is not in the push-pull arrangement shown in the drawings.

It has already been pointed out that control windings 240 and 250, of magnetic amplifiers 226 and 228, are connected in series and in the same sense and, therefore, carry the current caused by the IR compensation error quantity. Since the magnetic amplifiers are operated at approximately cut off, the amplifiers are selectively fired depending upon the sense of the circulating current. The mixing resistors 266 and 270 are in series in the control circuit loop which contains the control windings 82 and 94 of the magnetic amplifiers 64 and 66 in the first stage of amplification 30. Any voltage output from the IR compensation magnetic amplifier stage 224 will cause a variation in the current circulating through the control windings 82 and 94 and, therefore, exert a control on the output of the magnetic amplifiers 64 and 66 in the first stage of amplification 30 and thus, exert a control on the windings 34 and 36 of generator 22 and consequently, the speed of motor 10 in the sequence previously described.

For jogging, the voltage on adjustable master reference source 24 is reduced to zero by reducing the reference exciter voltage (reference exciter not shown) to a minimum and shorting the reference source 24 through a contact. This removes any effect of residual voltage on the reference exciter so the mill motor 10 is brought to a standstill by the regulating system actually bringing the mill voltage to zero. The mill is jogged only when the voltage on adjustable master reference bus is at zero. The jogging voltage is applied between terminals 272 and 274 but is only applied to the resistor 276 in the event that forward jogging switch 278 or reverse jogging switch 279 is depressed and a short referred to is placed across the adjustable master reference source through resistor 289. The jogging switches 278 and 279 are shown here as pushbutton switches merely as a matter of convenience.

If the forward jogging switch 278 is depressed the short across contacts 282 is removed which puts the jogging resistor 276 in the control circuit loop. At the same time the constants 280 are bridged so that the jogging voltage between terminals 272 and 274 will be applied to the jogging resistor 276 in the sense to cause the motor to jog in a forward direction. The contacts 283 will also be short circuited by the switch and thus the master reference source 24 is short circuited through resistor 289 to effectively remove the master reference source from the circuit.

When the reverse jog switch 279 is depressed a short is removed from contacts 275, which again in effect puts the jogging resistor 276 in the control circuit loop. At the same time, the short on contacts 271 is removed and a contact is made between the contacts 273 and also the contacts 269 which places the jogging voltage between terminals 272 and 274 across the resistor 276 in such a sense as to cause the motor to jog in a reverse direction. Depression of the reverse jogging switch also closes contacts 285 which again short circuits the master reference source 24 through the resistor 289.

It has already been pointed out that any jogging voltage which appears across the jogging resistor 276 will be in series in the control circuit loop. Since the voltage from the master reference source 24 is zero, there is no basic excitation supplied to the magnetic amplifiers 64 and 66 and the jogging voltage is now the reference with which the voltage of generator 22 is matched. Thus, any difference in the two voltages will cause a circulating current to flow through the control windings 82 and 94 of the magnetic amplifiers 64 and 66 and thus control the energization of the field windings 34 and 36 of generator 22, and ultimately the speed of motor 10 as previously described.

An exciter potentiometer or rheostat 284 is provided in series with the field 16 of exciter 14 to vary the excitation of the field of exciter 14 and consequently, the excitation of the field of the motor 10. The exciter potentiometer 284 has a slide portion 287 and an adjustable tap 286 ganged with tap 50. When tap 286 slides over the potentiometer 284, it changes the resistance of the potentiometer and thus the voltage across it except when the tap 286 is moved over the slide portion 287. When the tap 286 is on the slide portion 287 of potentiometer 284 a given portion of the potentiometer is in series with the field 16 on exciter 14 and thus it is assured that never more than a preselected portion of the exciter supply voltage can be on the field 16 of exciter 14. Since the excitation of the field 16 of exciter 14 determines the output voltage of exciter 14 and consequently the excitation of the field winding 12 for motor 10, the potentiometer 284 affords a motor speed control over a selected range.

The tap 286 on exciter potentiometer 284 is mechanically ganged to tap 50 on the reference potentiometer 52 which also has a slide portion 59. The tap 50 on the reference potentiometer 52 provides a motor armature voltage control to control the motor speed and the potentiometer 284 provides a motor excitation control which is also used to determine motor speed. The taps 50 and 286 on potentiometers 52 and 284 are ganged in such a way that when tap 50 is at the extremity of potentiometer 52 connected to resistor 63, tap 286 on potentiometer 284 is on the slide portion 287. Resistor 63 is provided to insure that the voltage with which the generator voltage is equilibrated is never less than a predetermined minimum represented by the voltage across resistor 63. As the tap 50 is moved upon potentiometer 52, the tap 286 on potentiometer 284 is on the slide portion 287 and therefore the voltage on the armature is controlled by the tap 50 within this range while the motor field excitation is constant. When the tap 50 reaches a slide portion 59, the tap 286 is on the variable resistor portion of its potentiometer 284. Thus as the tap is moved upward, the motor armature voltage does not change due to a change in reference voltage or basic excitation voltage but the motor field excitation provides the speed control. Therefore, the arrangement of the taps 50 and 286 on potentiometers 52 and 284 respectively, and the physical structure of these potentiometers give a definite preselected range of motor armature voltage control and a preselected range of motor field excitation control which can be utilized to determine the basic speed of the motor of each mill stand individually. It is to be understood that the particular arrangement shown is one preferred arrangement and is not to be construed as limiting.

The box 44, seen in Fig. 1B, contains the same components shown in the box 43 on Figs. 1A and 1B. The components in the box 44 operate in the same manner as described for the components in the box 43 to control the generator 40 and the motor 38. The components in box 44 cooperate with potentiometer 288 connected in series with resistor 291 across master reference source 24 and having a tap 290 which is mechanically ganged with tap 292 on the exciter potentiometer 294 which is connected in series with field winding 41 of exciter 42 and between the positive and negative terminals 296 and 298 in the same manner that the components in box 43 cooperate with the potentiometers 52 and 284.

The speeds and the ratios of the speeds of the motors 10 and 38, on the independent stands, are adjusted by their independent reference potentiometers 52 and 288 and their independent exciter potentiometers 284 and 294. Once the ratios of the speeds of the motors on the independent stands have been adjusted, the speeds of all the stands may be controlled by adjusting the variable master reference source 24. It will be seen that any variation in the variable master reference source 24 will change the voltage across the reference potentiometers 52 and 288 of the respective stands but will not cause a variation in the voltage on the exciter fields 16 and 41 for the respective stands. Thus, ratios of the speeds of the motors on the independent stands will remain constant as the adjustable master reference voltage is raised or lowered.

A diagrammatic view of alternative control circuits for two stands of a tandem mill embodying the invention is shown in the combined Figs. 5 and 1B. Components of the control system shown in the combined Figs. 5 and 1B which correspond to the components shown in Figs. 1A and 1B are given the same reference characters and perform the same functions as previously described. The differences in the two embodiments as shown resides principally in the output circuits of the first stage of magnetic amplifiers 30 and the control windings of the second stage of magnetic amplifiers 32. There is also a difference shown in the way in which the main windings 76 and 78 of magnetic amplifier 64 in the forward channel and the main windings 88 and 90 of the magnetic amplifier 66 in reverse channel receive their energization. An additional difference is seen in the feedback arrangement for the antihunt windings 82 and 94 of the magnetic amplifiers 64 and 66.

In the circuit of Fig. 5 the magnetic amplifiers 64 and 66 are preferably operated at approximately cut off, i. e. the bias windings are energized such that with zero control current the output of either amplifier is that minimum value which will permit an output from the amplifiers which is a linear function of control current. Thus the amplifiers are in effect selectively operated.

The magnetic amplifiers 64 and 66 of Fig. 5 do not have mixing resistors across the output of their respective load rectifiers 102 in full bridge arrangement as the resistors 106 and 108 of the corresponding magnetic amplifiers of Fig. 1A nor is there an interconnection between the rectifiers 102 in full bridge.

Connected directly across the load rectifiers 102 of magnetic amplifier 64 are the control windings 134, 136, and 138 of the three phase magnetic amplifier 70 in the second stage 32 of the forward channels. Again, the control windings 134, 136, and 138 are connected in series with each other and the gain adjusting resistor 139. In like manner, control windings 164, 166 and 168 of three phase magnetic amplifier 72 in the second stage 32 of the reverse channel 68 are connected in series with each other and gain adjusting resistor 169 directly across the output of the load rectifiers 102 in full bridge arrangement which receive the output of magnetic amplifier 66 in the reverse channel 68 of the first stage.

The magnetic amplifiers 70 and 72 are adjusted to operate in the same manner as described previously.

Since the outputs of the magnetic amplifiers 64 and 66 are isolated already in the circuit of Fig. 5, their main windings 76 and 78, and 88 and 90 respectively are supplied from bus bars 256 and 258 through the secondary of a single transformer 77. The two isolation transformers 79 and 99 of Fig. 1B is no longer necessary.

The antihunt windings 85 and 98 of the magnetic amplifiers 64 and 66 are again supplied by a feedback circuit which utilizes an RC network 289 which is for the same purpose and functions in the same manner as the RC network 208 of Fig. 1B which has already been described. The feedback is through two filtering RC networks 211 and 215 and is derived from balancing potentiometers 213 and 210 across forward and reverse fields 34 and 36 respectively. The RC networks 211 and 215 are simply to further improve the wave form of the output voltage and to improve the commutation of the magnetic amplifier in the magnetic amplifiers of the second stage 32.

Even though it is believed the operation of the apparatus, as applied in a tandem mill, will be apparent from the foregoing description, a brief review thereof will now be made for the purpose of summary, simplification, and to illustrate its superior performance.

All stands are matched to the same reference source 24 and the mill is accelerated and decelerated by increasing and decreasing the voltage of the reference source. The generator voltage is compared with a voltage responsive to the reference source and the difference is applied to the regulating magnetic amplifier control windings. The current in the control windings due to the voltage on them changes the saturation of the amplifier cores and thus the output of the magnetic amplifiers. Thus, the energization of the field windings of the main generator is adjusted to vary the generator output in such a manner as to correct the difference between the voltage on the error detecting means, or comparator due to the generator output and that due to the voltage from the master reference source. IR drop compensation is applied by a separate magnetic amplifier stage so that adjustment of IR drop compensation will be simple and independent of other system adjustments.

The adjustable master reference source 24 is zero when motor 10 is to be jogged. Thus it will be clear that no basic excitation voltage will be supplied to the magnetic amplifiers of any of the mill stands and the individual reference voltages with which the main generator voltage of the individual stands are compared are also removed and only the stand being jogged will have a reference voltage (which is the jog voltage). Therefore, any individual motor may be jogged alone but none of the mill stand motors can be jogged while the rest of the stand motors are running.

Figure 2:
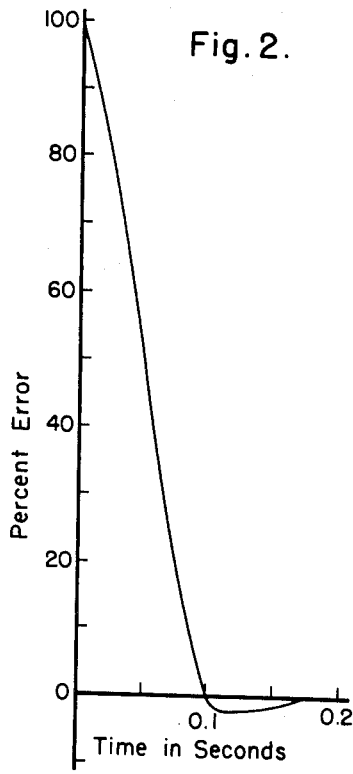
Figs. 2 and 3 show curves of aid in disclosing this invention.
Figure 3:
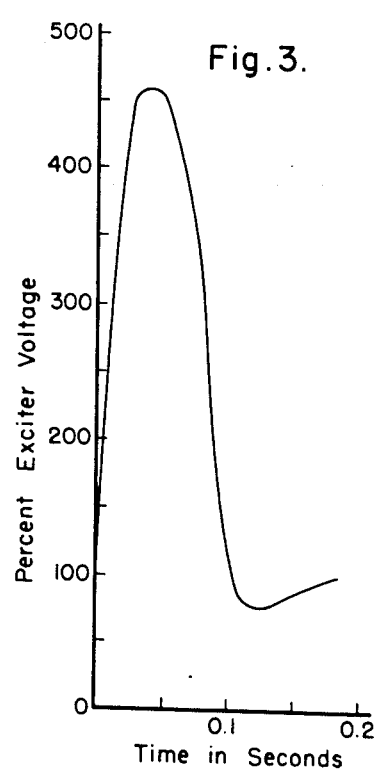

The response curve of Figs. 2 and 3 shows the difference between reference bus and generator voltage in one practical embodiment. These were obtained by inserting an instantaneous voltage into the reference bus by suddenly switching a battery into the circuit. This test is much more stringent than any mill operating condition, but it serves as an excellent measure of control system performance. In such practical embodiment, the response of the regulator with 75 per cent IR compensation is about 0.1 second, and is not greatly affected by motor field strength. With less IR compensation, the response is slightly faster. The system is practically 100 per cent damped even though it is unusually fast.

The curve shows the change in error volts after an instantaneous change in reference. Therefore, they are also curves of generator voltage response. However, the motor speed will follow the generator in a manner determined by the mechanical time constant and the amount of IR compensation.

The curve on net excitation voltage (net voltage on the fields of main generator 22 (Fig. 3) shows why such fast response is obtained. The power magnetic amplifier voltage rises to approximately 465 per cent of normal value in less than one-twentieth of a second. The time constant of the generator shunt field for this test was approximately four seconds. This large forcing voltage is responsible for the very fast changes in generator field excitation. The performance is amazing when it is considered that in less than one-tenth of a second the generator field voltage must rise to many times its rated value to force the correction and then return to rated value to prevent overshooting.

It will be recognized that the objects of the invention have been achieved by providing a motor control system which has low maintenance and stay-put features which would assure that once the device is adjusted it will remain adjusted, simplicity of adjustments for IR drop compensation, amplification, and damping, no overshoot under operating conditions, high amplifiations and thus high accuracy to provide the proper tracking of all stands from threading to maximum speeds when the control system is applied to a tandem mill, and very fast and well-damped transient response which will assure the best mill performance during acceleration, deceleration and emergency stops.

While in accordance with the patent statutes, one best known embodiment of the invention has been illustrated and described in detail, it is to be particularly understood that other embodiments and application are within the contemplation of the invention.

We claim as our invention:

1. An electric motor control system utilizing a main generator electrically connected to a motor, said control system comprising a first excitation means for the generator to produce a generator output which will cause the motor to rotate in one direction, a second excitation means for the generator to produce a generator output which will cause the motor to rotate in the opposite direction, at least one magnetic amplifier stage having selectively operable sections one for each of said excitation means connected in circuit relationship with the respective excitation means, control means for each channel, error detecting means responsive to the difference of a motor condition from a preselected value in circuit relationship with the control means for each channel to cause the energization of the generator excitation means to be selectively controlled in accordance with the sense of the error quantity from the error detecting means.

2. In a control system for electric motors utilizing a main generator electrically connected to a motor, said control system comprising circuit means connecting the output of the generator to a reference source to form error detecting means, the error quantity being responsive to the difference of a motor condition from a preselected value, a compensation source in series with said circuit means, said compensation source being determined by the output of a compensation amplifying means which has control means responsive to IR drop in the motor-generator circuit, field windings for the main generator, regulating amplifying means in circuit relationship with said field windings, control means for said amplifying means connected to the error detecting means to cause the energization of the generator field windings to be controlled.

3. In a control system for electric motors utilizing a main generator electrically connected to a motor, said system comprising circuit means connecting the output of said generator to a reference source to form error detecting means, the error quantity being responsive to the difference of a motor condition from a preselected value, a compensation source in series with said circuit means, said compensation source being determined by the output of at least one compensation magnetic amplifier stage, control means for said compensation magnetic amplifier stage responsive to IR drop in the motor generator circuit, field windings for the main generator, regulating amplifying means in circuit relationship with said field windings, control means for said amplifying means connected to the error detecting means to cause the energization of the generator field windings to be controlled.

4. In a control system for electric motors utilizing a main generator electrically connected to a motor, said system comprising circuit means connecting the output of said generator to a reference source to form error detecting means, the error quantity being responsive to the difference of a motor condition from a preselected value, a compensation source in series with said circuit means, said compensation source being determined by the output of at least one compensation magnetic amplifier stage having two selectively operated sections, and control means for each section responsive to IR drop in the motor-generator circuit, the sense of the IR drop being determinative of which section will be operative, field windings for the main generator, amplifying means in circuit relationship with said field windings, control means for said amplifying means connected to the error detecting means to cause the energization of the generator field windings to be controlled.

5. In a control system for an electric motor utilizing a main generator electrically connected to a motor, said system comprising circuit means connecting the output of the generator to a reference source to form error detecting means, the error quantity being responsive to the difference of a motor condition from a preselected value, a compensation source in series with said circuit means, at least one compensation magnetic amplifier stage having two selectively operated sections for determining said compensation source, and control means for each section responsive to IR drop in the motor-generator circuit, the sense of the IR drop being determinative of which section will be operative, field windings for the main generator, at least one regulating magnetic amplifier stage in circuit relationship with said field windings, control means for each regulating magnetic amplifier connected to the error detecting means to cause the energization of the generator field winding to be controlled.

6. In a control system for an electric motor utilizing a main generator electrically connected to a motor, said system comprising circuit means connecting the output of said generator to a reference source to form error detecting means, the error quantity being responsive to the difference of a motor condition from a preselected value, a compensation source in series with said circuit means, a compensation amplifying means for determining said compensation source, control means for said compensation amplifying means responsive to IR drop in the motor generator circuit, a field winding for the main generator, amplifying means in circuit relationship with said field winding, control means for said amplifying means supplied by the error quantity to cause the energization of the generator field winding to be controlled.

7. In a control system for an electric motor utilizing a main generator electrically connected to a motor, said system comprising circuit means connecting the output of said generator to a reference source to form error detecting means, the error quantity being responsive to the difference of a motor condition from a preselected value, a compensation source in series with said circuit means, at least one compensation magnetic amplifier stage for determining said compensation source, and control means for said compensation amplifying means responsive to IR drop in the motor-generator circuit, a field winding for the main generator, amplifying means in circuit relationship with said field winding, control means for said amplifying means supplied by the error quantity to cause the energization of the generator field winding to be controlled.

8. In a control system for an electric motor utilizing a main generator electrically connected to a motor, circuit means connecting the output of said generator to a reference source to form error detecting means, the error quantity being responsive to the difference of a motor condition from a preselected value, a compensation source in series with said circuit means, at least one compensation magnetic amplifier stage having two selectively operated sections for determining said compensation source, and control means for each section responsive to IR drop in the motor-generator circuit, the sense of the IR drop with respect to a preselected standard being determinative of which section will be operative, a field winding for the main generator, regulating amplifying means in circuit relationship with said field winding, control means for said amplifying means supplied by the error quantity to cause the energization of the generator field winding to be controlled.

9. In a control system for an electric motor utilizing a main generator electrically connected to a motor, said system comprising circuit means connecting the output of said generator to a reference source to form an error detecting means, the error quantity being responsive to the difference of a motor condition from a predetermined value, a compensation source in series with said circuit means, a compensation amplifying means for determining said compensation source, control means for said compensation amplifying means responsive to IR drop in the motor-generator circuit, a field winding for the main generator, at least one regulating magnetic amplifier stage in circuit relationship with said field winding, control means for each regulating magnetic amplifier connected to the error detecting means to cause the energization of the generator field windings to be controlled.

10. In a control system for an electric motor connected in a loop circuit with a main generator, comprising circuit means connecting the output of said generator to a reference source to form an error detecting means, the error quantity being responsive to the difference of a motor condition from a predetermined value, a compensation source in series with said circuit means, said compensation source being determined by the output of at least one compensating magnetic amplifier stage having two selectively operated sections, and control means for each section responsive to IR drop in the motor-generator circuit, the sense of the IR drop being determinative of which section will be operative, a field winding for the main generator, at least one regulating magnetic amplifier stage in circuit relationship with said field winding, control means for each regulating magnetic amplifier connected to the error detecting means to cause the energization of the generator field winding to be controlled.

11. An electric motor control system utilizing a main generator electrically connected to a motor, said system comprising circuit means connecting the output of said generator to a reference source to form error detecting means, the error quantity being responsive to the difference of the motor condition from a preselected value, a compensation source in series with said circuit means, a compensation amplifying means which has control means responsive to IR drop in the motor generator circuit for determining said compensation source, a first excitation means for the generator to produce a generator output which will cause the motor to rotate in one direction, a second excitation means for the generator to produce a generator output which will cause the motor to rotate in the opposite direction, at least one magnetic amplifier stage having selectively operable sections for said excitation means connected in circuit relationship with the respective excitation means, control means for each section in circuit relationship with said error detecting means to cause the energization of the generator excitation means to be selectively controlled in accordance with the sense of the error quantity from the error detecting means.

12. An electric motor control system utilizing a main generator electrically connected in a loop circuit with a motor, said system comprising circuit means connecting the output of said generator to a reference source to form error detecting means, the error quantity being responsive to the difference of the motor condition from a preselected value, a compensation source in series with said circuit means, at least one compensation magnetic amplifier stage for determining said compensation source, control means for said compensation amplifying means responsive to IR drop in the motor generator circuit, a first excitation means for the generator to produce a generator output which will cause the motor to rotate in one direction, a second excitation means for the generator to produce a generator output which will cause the motor to rotate in the opposite direction, at least one regulating magnetic amplifier stage having selectively operable sections for each of said excitation means connected in circuit relationship with the respective excitation means, control means for each section in circuit relationship with said error detecting means to cause the energization of the generator excitation means to be selectively controlled in accordance with the sense of the error quantity from the error detecting means.

13. An electric motor control system utilizing a main generator electrically connected to a motor, said system comprising error detecting means formed by circuit means comparing the generator output to a reference source, the error quantity being responsive to the difference of the motor condition from a preselected value, a compensation source in series with said circuit means, at least one compensating magnetic amplifier stage having two selectively operated sections for determining said compensation source, control means for each section responsive to IR drop in the motor-generator circuit, the sense of the IR drop being determinative of which section will be operative, a first excitation means for the generator to produce a generator output which will cause the motor to rotate in one direction, a second excitation means for the generator to produce a generator output which will cause the motor to rotate in the opposite direction, at least one regulating magnetic amplifier stage having selectively operable sections for each of said excitation means connected in circuit relationship with the respective excitation means, control means for each section in circuit relationship with said error detecting means to cause the energization of the generator excitation means to be selectively controlled in accordance with the sense of the error quantity from the error detecting source.

14. In a control system for an electric motor utilizing a main generator electrically connected to a motor, said system comprising a first excitation means for the generator to produce a generator output which will cause the motor to rotate in one direction, a second excitation means for the generator to produce a generator output which will cause the motor to rotate in the opposite direction, regulating amplifying means having selectively operable sections for each of said excitation means connected in circuit relationship with the respective excitation means, error detecting means responsive to the difference of a motor condition from a preselected value, control means for each section of the amplifying means connected in series with each other and said error detecting means to cause the energization of the generator excitation means to be selectively controlled in accordance with the sense of the error detecting means, at least each of one pair of said series connected control means having unidirectional conducting means being connected to be conductive in opposite senses.

15. An electric motor control system utilizing a main generator electrically connected in a loop circuit with a motor, said system comprising error detecting means formed by circuit means connecting the output of said generator to a reference source, the error quantity being responsive to the difference of a motor condition from a preselected value, a compensation source in series with said circuit means, a compensation amplifying means for determining said compensation source, control means for said compensation amplifying means responsive to the IR drop in the motor generator circuit, a first excitation means for the generator to produce a generator output which will cause the motor to rotate in one direction, a second excitation means for the generator to produce a generator output which will cause the motor to rotate in the opposite direction, at least one regulating magnetic amplifier stage having selectively operable sections for each of said excitation means connected in circuit relationship with the respective excitation means, control means for each section of the regulating amplifying means connected in series with each other and said error detecting means to cause the energization of the generator excitation means to be selectively controlled in accordance with the sense of error quantity from said error detecting means, unidirectional conducting means in shunt with at least each of one pair of control means and each of said unidirectional means being connected to conduct in opposite senses.

16. An electric motor control system utilizing a main generator electrically connected to a motor, said system comprising error detecting means formed by circuit means connecting the output of said generator to a reference source, the error quantity being responsive to the difference of the motor condition from a preselected value, a compensation source in series with said circuit means, at least one compensating magnetic amplifier stage determining said compensation source, control means for said compensation magnetic stage responsive to IR drop in the motor generator circuit, a first excitation means for the generator to produce a generator output which will cause the motor to rotate in one direction, a second excitation means for the generator to produce a generator output which will cause the motor to rotate in the opposite direction, at least one regulating magnetic amplifier stage having selectively operable sections for each of said excitation means connected in circuit relationship with the respective excitation means, control means for each section of the regulating amplifying means connected in series with each other and said error detecting means to cause the energization of the generator excitation means to be selectively controlled in accordance with the sense of the error quantity from the error detecting source, unidirectional conducting means in shunt with at least one pair of series connected control means, and each of said unidirectional conducting means being connected to conduct in opposite senses.

17. An electric control system for a motor connected to a main generator, said system comprising error detecting means formed by circuit means connecting the output of said generator to a reference source, the error quantity being responsive to the difference of the motor condition from a preselected value, a compensation source in series with said circuit means, magnetic amplifier sections having outputs which determine said compensation source, control means for each section responsive to the IR drop in the motor-generator circuit, the sense of the IR drop being determinative of which section will be operative, a first excitation means for the generator to produce a generator output which will cause the motor to rotate in one direction, a second excitation means for the generator to produce a generator output which will cause the motor to rotate in the opposite direction, at least one regulating magnetic amplifier stage having two selectively operable sections, one section for each of said excitation means connected in circuit relationship with the respective excitation means, control means each section of the amplifying means connected in series with each other and said error detecting means to cause the energization of the generator excitation means to be selectively controlled in accordance with the sense of the error quantity supplied by the error detecting means, unidirectional conducting means in shunt with at least each of one pair of said series connected control means for the regulating magnetic amplifiers, and each of said unidirectional conducting means being connected to conduct in opposite senses.

18. The combination, in a control system for a plurality of motors arranged in driving relation with a common mechanical load utilizing a main generator for each motor electrically connected to its associated motor, of individual error detecting means for each individual motor drive system formed by circuit means connecting the output of each main generator to a common reference source, the error quantities being responsive to the difference of the individual motor condition from a predetermined value, excitation means for each of said main generators, at least one magnetic amplifier stage for each main generator in circuit relationship with the excitation means of the associated main generator, control means for each magnetic amplifier connected to the associated error detecting means so that said associated excitation means will be energized in accordance with the magnitude of a preselected power source and the magnitude and sense of the associated error quantity to maintain the predetermined operating relations of the motors.

19. The combination, in a control system for a plurality of motors arranged in driving relation with a common mechanical load utilizing a main generator for each motor electrically connected to its associated motor, of individual error detecting means for each individual motor drive system formed by circuit means connecting the output of each main generator to a common reference source, the error quantities being responsive to the difference of the individual motor condition from a predetermined value, excitation means for each main generator, amplifying means for each main generator in circuit relationship with the excitation means of the associated main generator, control means for amplifying means connected to the associated error detecting means so that said associated excitation means will be energized in accordance with the magnitude of a preselected power source and the magnitude and sense of the associated error quantity to maintain the predetermined operating relations of the motors.

20. In a control system for a plurality of electric motors connected in driving relation to a common mechanical load utilizing a main generator for each motor electrically connected to the motor, a first excitation means for each main generator to produce a generator output which will cause the associated motor to rotate in one direction, a second excitation means for each main generator to produce a generator output which will cause the associated motor to rotate in the opposite direction, individual amplifying means associated with each generator having two selectively operable sections, one section for each of said excitation means connected in circuit relationship with the respective excitation means, control means for each section of each individual amplifying means, an error detecting means for each motor responsive to the difference of the motor condition from a preselected value and connected to the control means for each section of the associated amplifying means to cause the energization of the associated generator excitation means to be selectively controlled in accordance with the sense of the error quantity from the error detecting source to maintain the preselected relationship of conditions of the individual motors.

21. In a control system for a plurality of electric motors connected in driving relation to a common mechanical load utilizing a main generator for each motor electrically connected to the motor, a first excitation means for each main generator to produce a generator output which will cause the associated motor to rotate in one direction, a second excitation means for each main generator to produce a generator output which will cause the motor to rotate in the opposite direction, at least one individual magnetic amplifier stage associated with each generator having selectively operable sections for each of said excitation means connected in circuit relationship with the respective excitation means, control means for each section of each individual magnetic amplifier stage, an error detecting means for each motor responsive to the difference of the motor condition from a preselected value and connected to the control means for each section of the associated amplifying means to cause the energization of the associated generator excitation means to be selectively controlled in accordance with the sense of the error quantity from the error detecting source to maintain the preselected relationship of conditions of the individual motors.

22. In a control system for a plurality of electric motors connected in driving relation to a common mechanical load and utilizing a main generator for each motor electrically connected to the motor, error detecting means for each individual motor control system formed by circuit means connecting the output of the main generator of the system to a reference source, the error quantities being resonsive to the difference of the individual motor condition from a predetermined value, a compensation source in each drive control system and in series with each of said circuit means, at least one individual compensating magnetic amplifier stage in each drive motor control system having two selectively operated sections to determine the compensation source, control means for each section responsive to the IR drop in the associated motor-generator circuit, the sense of the IR drop being determinative of which section will be operative, a first excitation means for each main generator to produce a generator output which will cause the associated motor to rotate in one direction, a second excitation means for each main generator to produce a generator output which will cause the associated motor to rotate in the opposite direction, at least one regulating magnetic amplifier stage having two selectively operable sections, one section for each of said excitation means connected in circuit relationship with the respective excitation means, control means for each section of each stage of the amplifying means, the control means for each section of the amplifying means being connected in series with each other and said error detecting means for the associated control system to cause the energization of said generator excitation means to be selectively controlled in accordance with the sense of the error quantity supplied by the error detecting means, unidirectional conducting means in shunt with at least each of one pair of series connected control means for each individual motor control system and each of said unidirectional conducting means being connected to conduct in opposite sense.

23. In a control system for a plurality of electric motors connected in driving relation to a common mechanical load and utilizing a main generator for each motor electrically connected to the motor, error detecting means for each individual motor control system formed by circuit means connecting the output of the main generator of the system to a reference source, the error quantities being responsive to the difference of the individual motor condition from a predetermined value, a compensation source in each drive control system and in series with each of said circuit means, at least one individual compensating magnetic amplifier stage in each drive motor control system having two selectively operated sections to determine the compensation source, control means for each section responsive to the IR drop in the associated motor-generator circuit, the sense of the IR drop being determinative of which section will be operative, a first excitation means for each main generator to produce a generator output which will cause the associated motor to rotate in one direction, a second excitation means for each main generator to produce a generator output which will cause the associated motor to rotate in the opposite direction, at least one regulating magnetic amplifier stage having two selectively operable sections, one section for each of said excitation means connected in circuit relationship with the respective excitation means, control means for each section of each stage of the amplifying means, the control means for each section of the amplifying means being connected in series with each other and said error detecting means for the associated control system to cause the energization of said generator excitation means to be selectively controlled in accordance with the sense of the error quantity supplied by the error detecting means.

24. The combination, in a control system for a plurality of motors arranged in driving relation with a common mechanical load, of a main generator electrically connected to each motor, at least one magnetic amplifier stage associated with each main generator to control the output of said associated main generator in accordance with a condition of its associated motor and a common reference source, each successive motor control system having an increased gain.

25. The combination, in a control system for a plurality of motors arranged in driving relation with a common mechanical load utilizing a main generator for each motor electrically connected to its associated motor, of individual error detecting means for each individual motor drive system formed by circuit means connecting the output of each main generator to a common reference source, the error quantities being responsive to the difference of the individual motor condition from a predetermined value, excitation means for each of said main generators, at least one magnetic amplifier stage for each main generator in circuit relationship with the excitation means of the associated main generator, control means for each magnetic amplifier connected to the associated error detecting means so that said associated excitation means will be energized in accordance with the magnitude of a preselected power source and the magnitude and sense of the associated error quantity to maintain the predetermined operating relations of the motors, the control system for each successive motor having an increased gain.

26. The combination, in a control system for a plurality of motors arranged in driving relation with a common mechanical load utilizing a main generator for each motor electrically connected to its associated motor, of individual error detecting means for each individual motor drive system formed by circuit means connecting the output of each main generator to a common reference source to form the error quantities being responsive to the difference of the individual motor condition from a predetermined value, excitation means for each main generator, amplifying means for each main generator in circuit relationship with the excitation means of the associated main generator, control means for amplifying means connected to the associated error detecting means so that said associated excitation means will be energized in accordance with the magnitude of a preselected power source and the magnitude and sense of the associated error quantity to maintain the predetermined operating relations of the motors, the control system for each successive motor having an increased gain.

27. In a control system for a plurality of electric motors connected in driving relation to a common mechanical load utilizing a main generator for each motor electrically connected to the motor, a first excitation means for each main generator to produce a generator output which will cause the associated motor to rotate in one direction, a second excitation means for each main generator to produce a generator output which will cause the associated motor to rotate in the opposite direction, individual amplifying means associated with each generator having two selectively operable channels, one channel for each of said excitation means connected in circuit relationship with the respective excitation means, control means for each channel of each individual amplifying means, an error detecting means for each motor responsive to the difference of the motor condition from a preselected value and connected to the control means for each channel of the associated amplifying means to cause the energization of the associated generator excitation means to be selectively controlled in accordance with the sense of the error quantity from the error detecting source to maintain the preselected relationship of conditions of the individual motors, the control systems for each successive motor having an increased gain.

28. In a control system for a plurality of electric motors connected in driving relation to a common mechanical load utilizing a main generator for each motor electrically connected to the motor, a first excitation means for each main generator to produce a generator output which will cause the associated motor to rotate in one direction, a second excitation means for each main generator to produce a generator output which will cause the motor to rotate in the opposite direction, at least one individaul magnetic amplifier stage associated with each generator having selectively operable channels for each of said excitation means connected in circuit relationship with the respective excitation means, control means for each channel of each individual magnetic amplifier stage, an error detecting means for each motor responsive to the difference of the motor condition from a preselected value and connected to the control means for each channel of the associated amplifying means to cause the energization of the associated generator excitation means to be selectively controlled in accordance with the sense of the error quantity from the error detecting source to maintain the preselected relationship of conditions of the individual motors.

29. In a control system for a plurality of electric motors connected in driving relation to a common mechanical load and utilizing a main generator for each motor electrically connected to the motor, error detecting means for each individual motor control system formed by circuit means connecting the output of the main generator of the system to a reference source, the error quantities being responsive to the difference of the individual motor condition from a predetermined value, a compensaiton source in each drive control system and in series with each of said circuit means, at least one individual compensating magnetic amplifier stage in each drive motor control system having two selectively operated channels to determine the compensation source, control means for each channel responsive to the IR drop in the associated motor-generator circuit, the sense of the IR drop being determinative of which channel will be operative, a first excitation means for each main generator to produce a generator output which will cause the associated motor to rotate in one direction, a second excitation means for each main generator to produce a generator output which will cause the associated motor to rotate in the opposite direction, at least one regulating magnetic amplifier stage having two selectively operable channels, one channel for each of said excitation means connected in circuit relationship with the respective excitation means, control means for each channel of each stage of the amplifying means, the control means for each channel of the amplifying means being connected in series with each other and said error detecting means for the associated control system to cause the energization of said generator excitation means to be selectively controlled in accordance with the sense of the error quantity supplied by the error detecting means, unidirectional conducting means in shunt with at least each of one pair of series connected control means for each individual motor control system and each of said unidirectional conducting means being connected to conduct in opposite sense, the control system for each successive motor having an increased gain.

References Cited in the file of this patent
UNITED STATES PATENTS

| | | |
|---|---|---|
| 1,871,697 | James | Aug. 16, 1932 |
| 2,070,323 | Stokes | Feb. 9, 1937 |
| 2,186,839 | Rogers | Jan. 9, 1940 |
| 2,186,843 | Shoults | Jan. 9, 1940 |
| 2,320,833 | Shoults et al. | June 1, 1943 |
| 2,462,233 | Stoltz | Feb. 22, 1949 |
| 2,558,086 | Herchenroeder | June 26, 1951 |
| 2,600,308 | Lund et al. | June 10, 1952 |
| 2,629,847 | Eames et al. | Feb. 24, 1953 |
| 2,632,139 | Bloodworth | Mar. 17, 1953 |

OTHER REFERENCES

"The Amplistat and Its Application—Part III," General Electric Review, volume 53, issue 10, pages 41–46.